US012757812B2

(12) United States Patent
Rublee et al.

(10) Patent No.: US 12,757,812 B2
(45) Date of Patent: Oct. 13, 2026

(54) IMAGE SEGMENTATION FOR ROW FOLLOWING AND ASSOCIATED TRAINING SYSTEM

(71) Applicant: Bonsai Robotics Inc., San Jose, CA (US)

(72) Inventors: Ethan Rublee, Watsonville, CA (US); Gary Bradski, Palo Alto, CA (US); Wesley Chaney, Portland, OR (US); E. Riba, Barcelona (ES); Kyle Coble, Claremont, CA (US); Hauke Strasdat, Seattle, WA (US); Wren Ramsey, Monterey, CA (US)

(73) Assignee: Bonsai Robotics Inc., San Jose, CA (US)

( * ) Notice: Subject to any disclaimer, the term of this patent is extended or adjusted under 35 U.S.C. 154(b) by 0 days.

(21) Appl. No.: 18/869,592

(22) PCT Filed: May 25, 2023

(86) PCT No.: PCT/US2023/023628

§ 371 (c)(1),
(2) Date: Nov. 26, 2024

(87) PCT Pub. No.: WO2023/230292

PCT Pub. Date: Nov. 30, 2023

(65) Prior Publication Data

US 2025/0295050 A1 Sep. 25, 2025

Related U.S. Application Data

(60) Provisional application No. 63/346,311, filed on May 26, 2022.

(51) Int. Cl.
*G06V 20/00* (2022.01)
*A01B 69/00* (2006.01)
(Continued)

(52) U.S. Cl.
CPC .......... *A01B 69/008* (2013.01); *A01B 69/001* (2013.01); *G05D 1/243* (2024.01); *G06V 20/10* (2022.01); *G06V 20/70* (2022.01)

(58) Field of Classification Search
None
See application file for complete search history.

(56) References Cited

U.S. PATENT DOCUMENTS

| | | | | |
|---|---|---|---|---|
| 6,686,951 B1 * | 2/2004 | Dickson | G06V 20/38 | 348/120 |
| 11,748,976 B2 * | 9/2023 | Redden | G06V 10/764 | 382/110 |

(Continued)

FOREIGN PATENT DOCUMENTS

WO 2021043904 A1 3/2021

OTHER PUBLICATIONS

International Search Report and Written Opinion from International Application No. PCT/US23/23628 dated Oct. 9, 2023, 17 pages.

(Continued)

*Primary Examiner* — James M McPherson
(74) *Attorney, Agent, or Firm* — Fenwick & West LLP

(57) ABSTRACT

Methods and systems related to computer vision for agricultural applications are disclosed herein. A disclosed method for navigating a robot along a crop row, in which each step is computer-implemented by a navigation system for the robot, includes capturing an image of at least a portion of the crop row, labeling, using a segmentation network, a portion of the image with a label, deriving a navigation path from the portion of the image and the label, generating a control signal for the autonomous navigation system to follow the navigation path, and navigating the robot along the crop row using the control signal.

17 Claims, 7 Drawing Sheets

(51) Int. Cl.

| | |
|---|---|
| ***A01B 69/04*** | (2006.01) |
| ***G05D 1/243*** | (2024.01) |
| ***G06V 20/10*** | (2022.01) |
| ***G06V 20/70*** | (2022.01) |

(56) References Cited

U.S. PATENT DOCUMENTS

| | | | | |
|---|---|---|---|---|
| 11,922,620 | B2 * | 3/2024 | Hernandez | G06T 5/80 |
| 2007/0001097 | A1 * | 1/2007 | Wei | A01B 69/001 250/208.1 |
| 2007/0005208 | A1 * | 1/2007 | Han | A01B 69/001 701/50 |
| 2007/0014434 | A1 * | 1/2007 | Wei | G06V 10/243 382/104 |
| 2013/0238201 | A1 * | 9/2013 | Redden | A01M 21/00 701/50 |
| 2014/0180549 | A1 * | 6/2014 | Siemens | A01B 39/18 701/50 |
| 2020/0026283 | A1 | 1/2020 | Barnes et al. | |
| 2020/0094874 | A1 * | 3/2020 | Sights | B60W 50/00 |
| 2020/0364521 | A1 * | 11/2020 | Bradski | G06V 10/25 |
| 2020/0364913 | A1 | 11/2020 | Bradski | |
| 2021/0150184 | A1 * | 5/2021 | Dai | G06V 10/457 |
| 2021/0158041 | A1 | 5/2021 | Chowdhary et al. | |
| 2021/0185882 | A1 * | 6/2021 | Eichhorn | G06T 5/80 |
| 2022/0317691 | A1 * | 10/2022 | Eskandari | A01B 69/001 |
| 2022/0397906 | A1 * | 12/2022 | Sneyders | G05D 1/0214 |
| 2023/0012175 | A1 * | 1/2023 | Edo | G06V 10/82 |
| 2023/0043631 | A1 * | 2/2023 | Sandbrook | B25J 5/007 |
| 2024/0130263 | A1 * | 4/2024 | Miyashita | A01B 69/001 |
| 2024/0196781 | A1 * | 6/2024 | Miyashita | A01B 69/001 |
| 2024/0202966 | A1 * | 6/2024 | Miyashita | A01B 69/001 |
| 2024/0265547 | A1 * | 8/2024 | Cui | A01B 69/008 |

OTHER PUBLICATIONS

V. R. Ponnambalam et al. (2020). Autonomous Crop Row Guidance Using Adaptive Multi-ROI in Strawberry Fields. Sensors (Basel, Switzerland), 20.

International Preliminary Report on Patentability from International Application No. PCT/US2021/022374 dated Dec. 5, 2024, 11 pages.

EP Office Action Mailed on Nov. 4, 2025 for EP Application No. 23738215, 9 page(s).

Rashed et al., "Deep learning based crop row detection with online domain adaptation." KDD '21, Virtual Event, Aug. 14-18, 2021, pp. 2773-2781.

* cited by examiner

IMAGE SEGMENTATION FOR ROW FOLLOWING AND ASSOCIATED TRAINING SYSTEM

CROSS REFERENCE TO RELATED APPLICATIONS

This application is a national stage filing under 35 U.S.C. § 371 of international application number PCT/US23/23628 filed on May 25, 2023, which claims the benefit of U.S. Prov. Pat. App. No. 63/3463,11, filed on May 26, 2022, all of which are incorporated by reference herein in their entireties for all purposes.

BACKGROUND

Computer vision systems can be used to guide automated robotic agricultural processes such as robotic manipulations (e.g., picking cherry tomatoes) or robotic navigation (e.g., navigating along a crop row). Computer vision systems can be based on machine learning systems which can be trained to perform certain tasks. Computer vision machine learning systems can be trained with unsupervised training routines in which labeled training data is not required. However, in agricultural applications, robots need to operate within a low margin of error to avoid damaging crops. Furthermore, field robots need to operate in a large variety of environments such as in fields with different crops, fields with different crops at different growth stages, fields with different planting configurations, and fields in different biomes, seasons, and climates, as well as in both indoor greenhouses and open-air fields. These requirements for high accuracy and wide generalizability tend to render unsupervised training routines inadequate for computer vision machine learning systems in agricultural applications. However, supervised training of computer vision machine learning systems requires large training data sets to produce systems that are generalizable across many environments. The training data samples are typically provided in the form of labeled data which is difficult to obtain as it often requires the manual work of human annotators to generate the labels for the data set.

SUMMARY

Methods and systems related to computer vision for agricultural applications are disclosed. Methods and systems are disclosed that include navigation systems for navigating a robot along a crop row. The navigation systems can utilize trained computer vision machine learning systems, such as trained segmentation networks, which are used to segment image data into one or more labeled segments. In specific embodiments of the invention disclosed herein, one of the labeled segments can be an inter-row path, and the navigation system can use the labeled segment to derive a navigation path along the crop row and generate a control signal to navigate the robot along the navigation path. The segmentation networks can be trained machine intelligence systems which are trained using a supervised training routine.

In specific embodiments of the invention, methods and systems for effectively training a navigation system for a field robot are provided. The methods function to train the navigation system to navigate the robot in a new environment where the field robot has little or no prior knowledge of the new environment without requiring a large amount of manually annotated training data.

In specific embodiments of the invention, in contrast to traditional training approaches, a trained computer vision machine learning system can be trained directly on the data the system will be deployed to operate upon. For example, the trained computer vision machine learning system can be trained on a representative crop row from a set of crop rows on a single field or a single farm, and then be deployed to navigate a robot along that particular set of crop rows. While such a trained computer vision machine learning system might not be generalizable to other applications such as crop row following on other farms, the amount of training data required to get the system ready for deployed is orders of magnitude less than for more generalizable systems. For example, using the approaches disclosed herein, the labeled training data set required to provide adequate row following navigation performance, including avoiding collisions with obstacles such as humans or irrigation equipment in the field, can be as small as 10 to 15 frames of labeled data. Furthermore, in specific embodiments of the invention disclosed herein, a human operator is provided with an intuitive interface for easily and efficiently generating the labels for this small collection of labeled data. Furthermore, in specific embodiments of the invention disclosed herein, the labeled training data can be obtained entirely without labeling inputs from a human operator.

In specific embodiments of the invention disclosed herein, a method for navigating a robot along a crop row is provided. Each step of the method can be computer-implemented by a navigation system for the robot. The method can comprise capturing an image of at least a portion of the crop row, labeling, using a segmentation network, a portion of the image with a label, deriving a navigation path from the portion of the image and the label, generating a control signal for the autonomous navigation system to follow the navigation path, and navigating the robot along the crop row using the control signal.

In specific embodiments of the invention disclosed herein, methods for training a navigation system to navigate a robot along a crop row in a set of crop rows are provided. The methods comprise capturing a set of images of at least a portion of the set of crop rows, displaying the set of images on a user interface, accepting a set of label inputs on the set of images on the user interface, and training a segmentation network using the set of label inputs and the set of images.

In alternative specific embodiments of the invention disclosed herein, methods for training a navigation system to navigate a robot along a crop row are provided that do not require human labeling inputs. The methods comprise capturing a set of images of at least a portion of the set of crop rows while navigating the robot down the crop row and conducting a photogrammetric analysis on the set of images to generate a set of label inputs on the set of images on the user interface. The photogrammetric analysis includes solving for a path location in a first image based on an analysis of a second subsequently captured image. The methods further comprise training a segmentation network using the set of label inputs and the set of images.

In specific embodiments of the invention disclosed herein, methods for navigating a robot along a crop row in a set of crop rows comprise training a navigation system according to any of the training methods described in the prior paragraph and then navigating, after training the segmentation network, the robot along the crop row using the segmentation network. The set of crop rows can be a set of crop rows in a single field or on a single farm.

DETAILED DESCRIPTION

Figure 1:
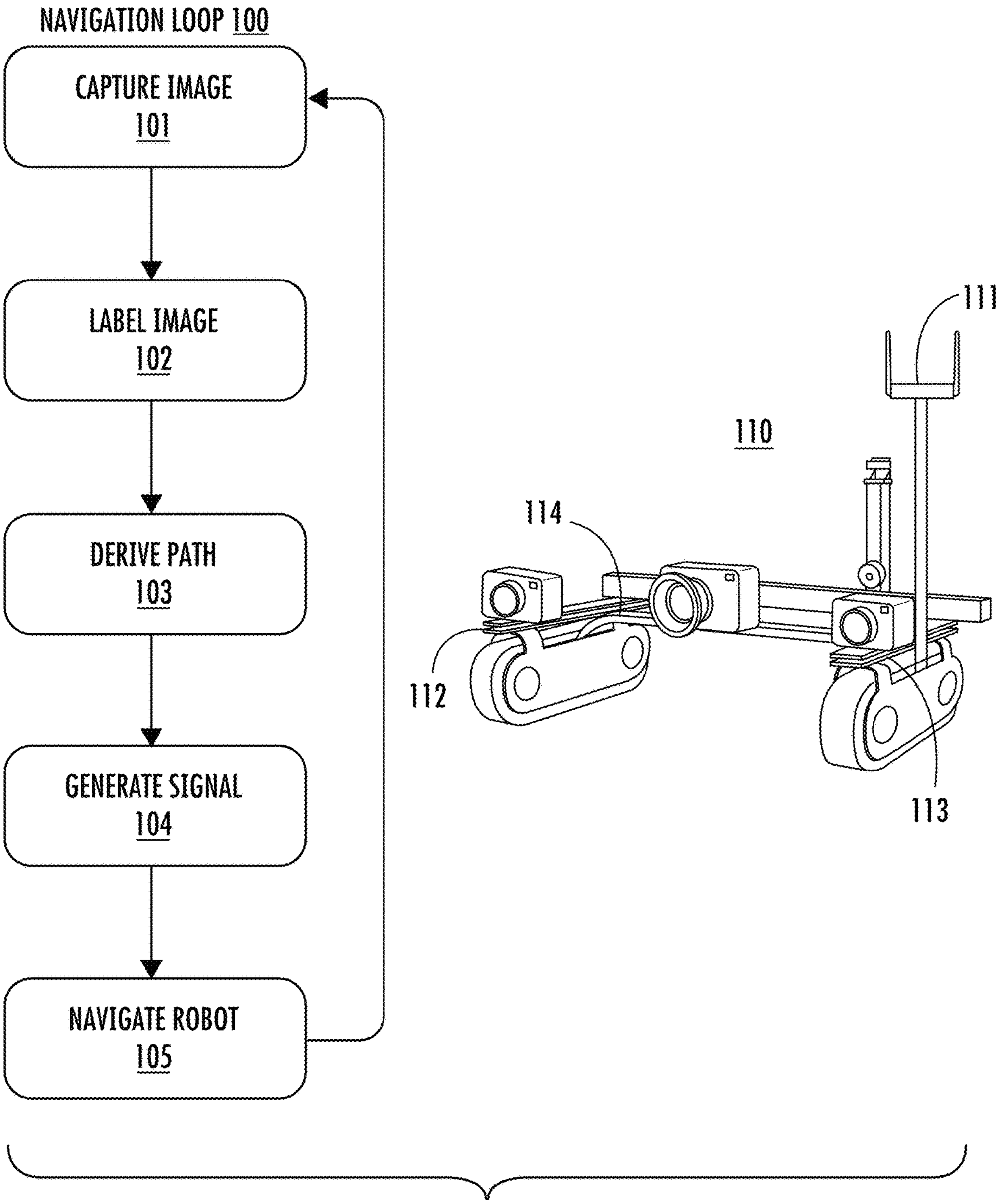
FIG. 1 illustrates a flow chart for a set of methods in accordance with specific embodiments of the invention disclosed herein.

Methods and systems related to the field of computer vision for agricultural applications in accordance with the summary above are disclosed in detail herein. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

In specific embodiments of the invention, a method for navigating a robot along a crop row includes a set of steps that are computer-implemented by a navigation system for the robot. The navigation system can be used to guide a robot along a crop row and can be applied to robots that are tasked with executing agricultural tasks. The navigation system can be designed to guide the robot along a row of crops from the start to the end while interacting with or avoiding objects encountered in that path, for example stopping for a human or not colliding with a wheelbarrow as the robot follows the path to the end of the crop row. The robot can then be turned around manually at the end of the crop row and the navigation system can be reengaged to start the robot following the next row. Alternatively, the navigation system can also turn the robot at the end of the row and proceed with the next crop row.

The navigation system can be implemented by non-transitory computer readable media storing instructions to execute the methods disclosed herein. The non-transitory computer readable media can be one or more memories such as nonvolatile memory onboard the robot. However, in specific embodiments, the non-transitory computer readable media can include memories that are remote from the robot and located in a datacenter or local server that is network accessible to the robot. The robot can include one or more processors such as microprocessors, machine learning accelerators, microcontrollers, or other elements that can execute the stored instructions and send out control signals to actuators, sensors, and other systems on or off the robot to execute the methods disclosed herein.

The robot can be an agricultural robot that is intended to conduct one or more agricultural tasks such as evaluating, culling, harvesting, watering, weeding, and fertilizing crops. The robot can be a ground-based vehicle with a portion that moves along the ground such as a legged, wheeled, or tracked vehicle. The portion that moves along the ground can be connected to a platform for conducting the agricultural task of the robot. The robot can be designed to move along a single inter-crop row path or straddle a crop row and move its wheels or tracks along two adjacent inter-crop row paths. As such, navigating the robot along the crop row can include moving the robot along the crop row while making sure the portion which touches the ground stays on the path, or otherwise moves in a way that avoids crushing the crops or disturbing the soil close to a delicate crop. Navigating the robot can also include detecting obstructions in the path of the robot such as humans, animals, irrigation equipment, or other agricultural equipment and either avoiding the obstruction while continuing down the crop row or stopping entirely. Navigating the robot can also include detecting the end of a row so that the robot can stop and be manually turned around for the next row or can initiate a separate navigation procedure to autonomously align itself with the next row. While the example of a ground-based vehicle is used throughout this disclosure as an example, specific embodiments disclosed herein apply to any air borne robots such as buoyant, fixed wing, or rotary craft that are designed to navigate in an agricultural setting.

In specific embodiments of the invention, a method for navigating a robot along a crop row includes a step of capturing an image of at least a portion of a crop row. The image can be captured by one or more sensors such as one or more imagers. The sensors can be on the robot. The image can be captured by at least one imager on the robot. The image can be captured using at least two imagers on the robot. The image can include depth information as captured by two or more imagers operating in combination to capture stereo depth data, or by a dedicated depth sensor. The image can include image data from one or more electromagnetic spectra (e.g., SWIR, IR, UV, visible light, etc.) The image can be a black and white, greyscale, or color image. The image can be a 1, 2, 2.5, or 3-dimensional image.

In specific embodiments of the invention, the image can be captured by one or more sensors. For example, the image could be captured by a single sensor in the form of a visible light camera capturing a two-dimensional grey-scale image of a portion of the crop row. As another example, the image could be captured by a pair of sensors in the form of two visible light cameras capturing a 2.5-dimensional grey-scale image of a portion of the crop row by using stereo vision to determine the depth of the pixels in the image. As another example, the pair of sensors in the prior example could be augmented with a third sensor in the form of a color visible light camera to capture a 2.5-dimensional color image of the portion of the crop row. As another example, the image could be captured by a visible light color camera paired with a dedicated depth sensor to capture a 2.5-dimensional color image of the portion of the crop row.

In specific embodiments of the invention, the sensor that captures the image can be positioned in various ways relative to the robot. For example, the imager can be attached to the robot and locked in a fixed position relative to the robot, or it can be on a separate vehicle such as an arial drone or additional ground-based robot that moves in front of the robot and captures the image. The sensor can be in a fixed position and pose relative to the robot throughout operation, or it can be designed to alter its position during operation. In specific embodiments of the invention, a sensor is attached to the robot and registered with respect to the body of the robot in the navigation system such that an evaluation of the image inherently includes an evaluation of where certain portions of the robot are relative to the content of the image. In specific embodiments, the pose of the imager can be adjustable by a control system such that the imager is registered with respect to the body of the robot regardless of the pose of the imager selected by the control system.

The portion of the crop row captured in the image can take on various characteristics. The portion of the crop row can include at least one inter-crop row path. The portion of the crop row can include the crops in the crop row. The portion of the crop row can be a portion that is ahead of the vehicle and generally aligned with a portion of the robot that touches the ground such as a wheel of the robot. In specific embodiments, the portion of the crop row can be an area surrounding the robot and include a portion of the robot, and the image can be a bird's eye image of that area. Such an image can be captured by a separate platform located above the robot or a sensor attached to the robot via an appendage and suspended above the portion of the robot.

FIG. 1 illustrates a flow chart 100 for a set of methods for navigating a robot 110 along a crop row in which each step is computer-implemented by a navigation system 111 for the robot 110. The flow chart includes a looped path because it can be continuously executed while the navigation system is in operation. For example, the loop could be conducted every 0.1 seconds, every 1 second, or more or less frequently based on the degree of precision and safety required balanced against the computational and energy requirements associated with rapid execution and the fact that the robot may move relatively slowly compared to a rapid execution of the loop. In the illustrated case, the navigation system 111 is fully implemented by one or more processors and non-transitory computer-readable media on robot 110. The segmentation network could be part of the navigation system and be computer-implemented on robot 110 (i.e., be implemented by one or more processors and non-transitory computer-readable media on robot 110).

Flow chart 100 can begin with step 101 of capturing an image of at least a portion of the crop row. The image can be captured by at least one imager on the robot such as imager 114. Imager 114 can be a color camera. The image can also be captured using at least two imagers such as imager 112 and imager 113. Imager 112 and imager 113 can be greyscale imagers. All three of the imagers can be used in combination to capture a single image. Alternatively, imager 112 and imager 114 can work to capture a single image of one inter-crop row path while imager 113 and imager 114 can work to capture a second image of an adjacent inter-crop row path. The images captured in accordance with this disclosure can be an image such as those represented by images 200 in FIG. 2 which are captured by a greyscale camera positioned on the robot with a view in the intended forward direction of travel for the robot and roughly aligned with a wheel or track of the robot. Images 200 include three images 200A, 200B, 200C, which are the same capture image with different annotations. As seen in image 200A, the image includes a portion of a crop row including an inter-crop row path 201. The inter-crop row path 201 can be used to move equipment, such as the robot, along the crop row without disturbing the crops. Accordingly, a method for navigating a robot along the crop row can include attempting to keep a portion of the robot that touches the ground within the bounds of inter-crop row path 201.

In specific embodiments of the invention, a method for navigating a robot along a crop row includes a step of labeling, using a segmentation network, a portion of an image with a label. The image can be an image of at least a portion of a crop row and can have the characteristics of the images described above. The step of labeling can involve the image being provided as an input to a segmentation network. The step can involve the image being provided as an input to the segmentation network with or without preprocessing to prepare the image as an input to the segmentation network. The segmentation network can be modeled after the architecture of SegNet, U-Net, M-net, Mask-RCNN, PspNet, GSCNN, and others. In specific embodiments, the segmentation network can be computer-implemented on the robot. For example, in specific embodiments, the segmentation network can be a lightweight segmentation network that can be deployed and executed on an embedded controller on the robot. The segmentation network can be a lightweight segmentation network that can be trained, and/or be used to generate inferences, on a small embedded system as opposed to on a cloud-based server. For example, the network could be embedded on a simple Arduino or Raspberry PI system.

In specific embodiments of the invention, the input to the segmentation network can include additional data that is used in combination with the image data. For example, the input can involve metadata regarding the image such as a time at which the image was taken, the weather at the time the image was taken, an ambient light condition at the time the image was taken, or other metadata. As another example, the input can involve additional sensor data taken acquired with the image data by additional sensor data such as depth data of the object, radar data, stereo image data of the object, odometry data of the robot, inertial movement unit data of the robot, gravimetric data, image data from multiple electromagnetic spectra (e.g., SWIR, IR, UV, visible light, etc.), and others. The additional sensor data can be collected by additional sensors on the device.

In specific embodiments of the invention, the robot can include an onboard machine learning accelerator to assist in the training or execution of the segmentation network. The image can be provided as an input to the segmentation network along with additional data, or alone. The output of the segmentation network can have the same dimensions as the input and provide a labeling value for each pixel or voxel in the input image. As described below, the label could be a single binary labeling value, or one labeling value selected from among a set of labels.

The segmentation network can be a trained machine intelligence system such as an artificial neural network (ANN). Alternative trained machine intelligence systems can be used in place of the segmentation network. Trained machine intelligence system that can be used in accordance with embodiments of the invention disclosed herein can be ANNs, support vector machines, or any type of functional approximators or equivalent algorithmic systems that can be iteratively adjusted using image data. The image data used to train the trained machine intelligence system can include real images or simulated images. The training can involve supervised learning using labeled image data or unsupervised learning. In the case of an ANN, multiple forms of ANNs can be utilized including convolutional neural networks, adversarial networks, attention networks, recursive neural networks (RNNs), and various others. The ANN can include multiple layers such as convolutional layers, fully connected layers, pooling layers, up sampling layers, dropout layers, and other layers. The ANN can include one or more encoders and one or more decoders. The ANN can be feed forward only or include recursive pathways such as in the case of an RNN. The trained machine intelligence system can be trained using one or more of a linear regression, support vector regression, random forest, decision tree, or k-nearest neighbor analysis.

In specific embodiments of the invention, labeling can be conducted in various ways. For example, the segmentation network can analyze the pixels, voxels, or other elements of the image, and apply labels to the pixels in the form of an output of the segmentation network. For example, the network could determine those certain elements that are part of an inter-crop row path, and those that are not, and label the portions that are part of the inter-crop row path accordingly. The output could thereby be as simple as a binary assignment of values to the elements of an image indicating whether the element is part of an inter-crop row path or not. As another example, the network could determine those certain pixels or voxels that are part of a left crop row, a right crop row, irrigation equipment, an animal, a human, a horizon, an end of a row, and other potential classes and label them as such. In specific embodiments of the invention, the labels can be user defined and specified by a user using a text string and training data labeled with the user defined label. The output of the segmentation network can be a label for one or more elements of the image. Contiguous sets of elements with common labels applied can be referred to herein as segments of the image. For example, a common label for a "human" on a set of contiguous portions of the image can be referred to as a segment attributable to a detected person in the image.

In specific embodiments of the invention in which the segmentation network outputs multiple outputs, certain benefits can be realized in that the segmentation network can provide more information than what is required for the task of row following. For example, such embodiments may not require a separate collision detection system in addition to the navigation system thereby reducing the required complexity of the overall system. Furthermore, the ability to label, and thereby recognize, additional features that rise above the field and are visible from far off can allow the navigation system to localize itself within a crop row, field, or farm. Furthermore, the ability to label additional features provides additional possibilities for geometric cross checks on the labeling of the image in that adding additional labels increases the degree of geometric and logical consistency expected between the multiple segments as will be described below. The ability to conduct two or more of these actions with a single system can therefore increase the performance of the system and may in the alternative or in combination decrease the computational complexity and resource requirements of the system.

Figure 2:
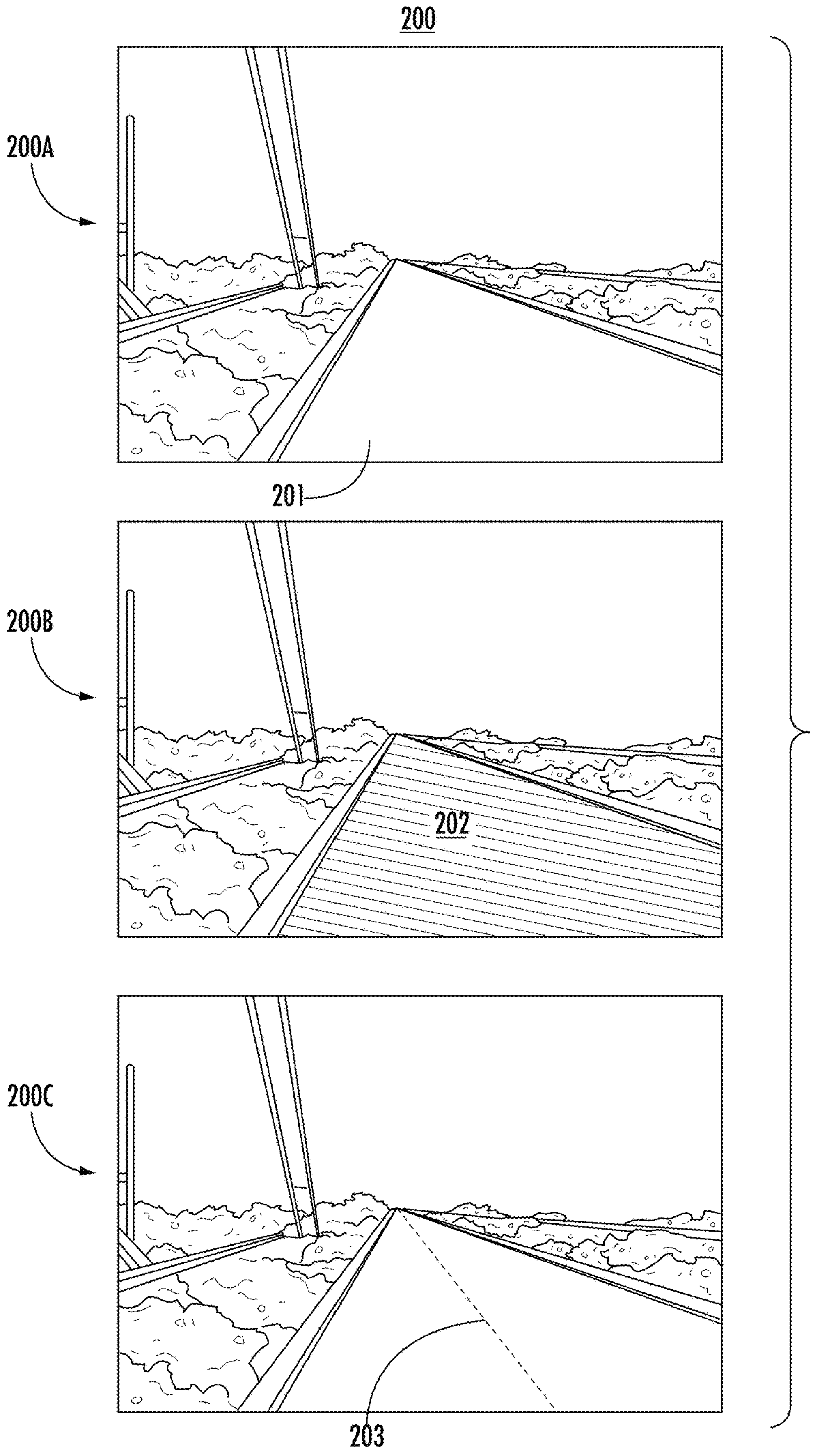
FIG. 2 illustrates an inter-crop row path annotated with a navigation path in accordance with specific embodiments of the invention disclosed herein.

Flow chart 100 continues with step 102 of labeling, using a segmentation network, a portion of the image with a label. This step can be conducted automatically by a segmentation network with the image as an input and the labeled image as an output. For example, the image can be image 200B from FIG. 2. The portion of the image can include inter-crop row path 201, and the labeling can label inter-crop row path 201 with a matching label. As illustrated in FIG. 2, image 200B has been segmented by the segmentation network to produce segment 202 which is a set of pixels from image 200B that have been labeled as part of the path. If the segmentation network is performing correctly, segment 202 should align with inter-crop row path 201. In specific embodiments of the invention, step 102 can include labeling, using the segmentation network, a second portion of the image with a second label. Step 102 can likewise include segmenting any number "X" of portions of the image where "X" is the number of labels the segmentation network has been designed to apply to the elements of an image.

Figure 3:
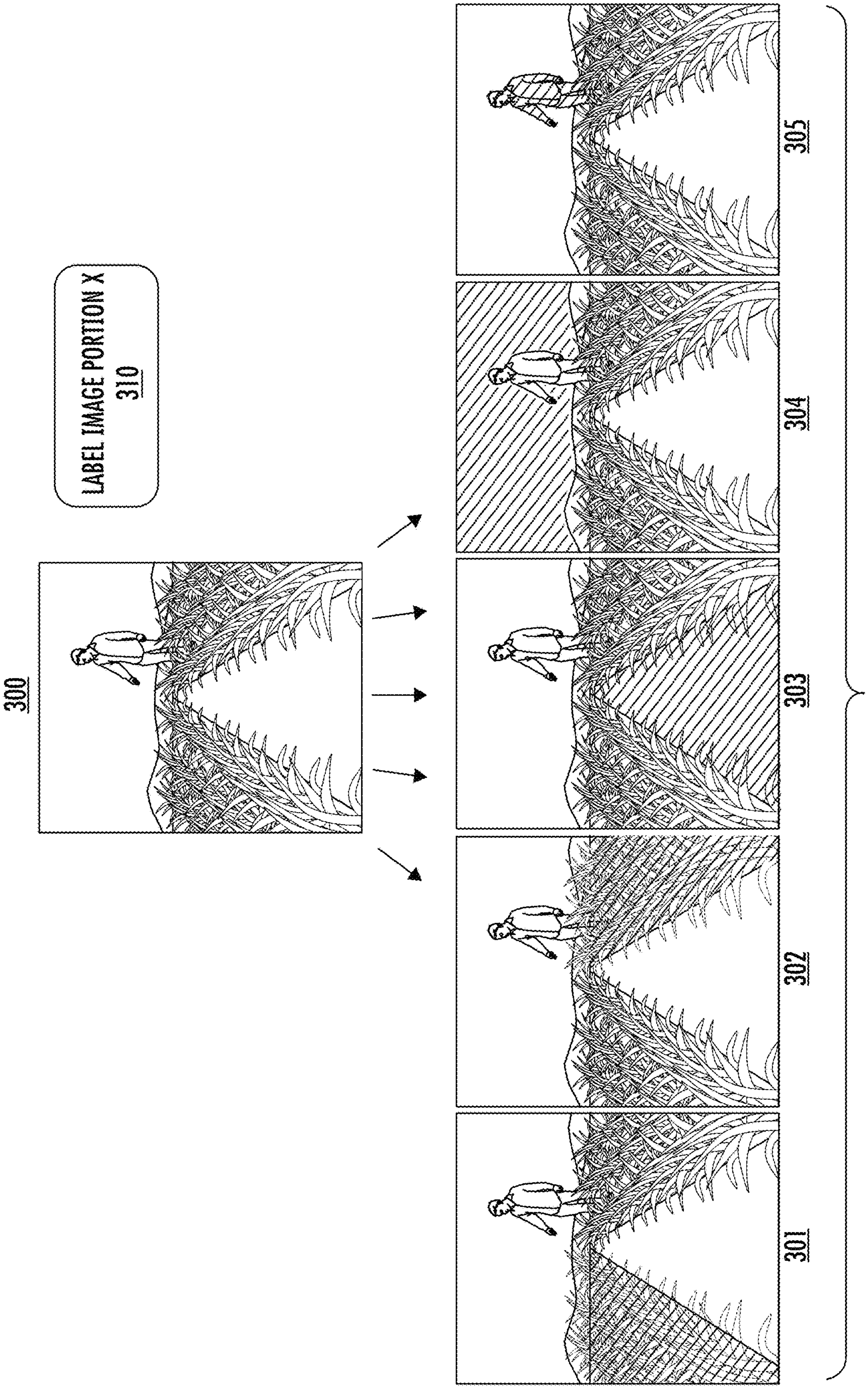
FIG. 3 illustrates an example of the output of a segmentation network designed to segment an input image into multiple segments with different labels in accordance with specific embodiments of the invention disclosed herein.

FIG. 3 provides an example of the output of a segmentation network used in a step, such as step 102, in which the segmentation network is designed to segment an input image into multiple segments with different labels. Accordingly, FIG. 3 includes step 310 of labeling, using a segmentation network, X portions of an image with X labels. For example, step 310 can include labeling, using the segmentation network, a second portion of the image with a second label. As illustrated, a single input image 300 of a portion of a crop row is segmented into five segments. The segments include those labeled by a left crop row label 301, a right crop row label 302, an inter-crop row path label 303, a sky label 304, and a human label 305. The multiple labels displayed in FIG. 3 can assist in obstacle avoidance by avoiding a collision with portions of the image with the human label 305. For example, identifying a human label 305 either partially or surrounded by an inter-crop row path label 303 could indicate that the robot should stop until provided with manual input to continue, or automatically after the assumed human obstruction no longer continued to appear in the output of the segmentation network. Furthermore, the multiple labels applied to single input image 300 can assist in automated geometric cross checks on the segmentation network performance. For example, if a portion of the left row appeared to the right of the right row, a deficiency in the segmentation could be detected.

In specific embodiments of the invention, a navigation system can derive a navigation path from a portion of an image and a label as generated above. The navigation path can be a desired path for the robot to take. For example, the path can be a specific set of locations where a portion of the robot that touches the ground should touch the ground. For example, the path can be a path where the wheel of a wheeled robot is expected to roll along the ground. This process can involve analyzing the portion of the image and the label (e.g., the segment) associated with an inter-crop spacing path of the image, finding a centroid of the segment in a set of lateral slices of the image from the bottom to the top, and linking the centroids of those segments into a path. The derivation can be conducted with various goals in mind including avoiding obstructions, keeping a portion of the robot that touches the ground as far as possible from crops in the crop row, minimizing changes in direction, and various other goals in the alternative or in combination. These derivations can also utilize more than one label, such as a label for a left and right crop row, for the derivation to maximize the distance of the path from both rows, or a label for a human or irrigation system for the derivation to avoid the robot from colliding with the obstruction. Numerous alternative approaches are possible with the result being a navigation path for the robot in the frame of reference of the image.

Flow chart 100 continues with a step of deriving a navigation path from a portion of an image and a label. For example, the portion of the image can be the portion labeled as segment 202 in FIG. 2. The navigation path can be derived using this portion of the image using various mathematical analyses of the portion of the image and the label. As shown in image 200C in FIG. 2, the derivation has been conducted to guide the robot down the center of the inter-crop path and has therefore produced navigation path 203. Navigation path 203 can be defined with reference to the pixels of image 200. For example, the navigation path can be a data structure defining a set of pixel coordinates on image 200C.

In specific embodiments of the invention, a navigation system can generate a control signal for the navigation system to follow a navigation path generated according to the approaches disclosed herein and can then navigate the robot along the crop row using the control signal. Accordingly, flow chart 100 includes step 104 of generating a control signal for the autonomous navigation system to follow and a step 105 of navigating the robot to follow the navigation path. The control signal can be generated to assure that the robot follows the navigation path. The process of generating the control signal can include the process of translating the navigation path in the coordinates of the image into actionable control signals provided to the actuators of the robot. The control signals can include a carrot that the robot is designed to follow which is projected onto the navigation path a specified distance away from the robot. The controller can be designed to align the robot with the carrot and reach the carrot. The carrot can be updated less frequently than the navigation path is derived to prevent excess noise in the control signal. However, in specific embodiments, the carrot should be updated faster than the robot can get within proximity of the carrot as the robot may be designed to slow down before reaching a target. In these embodiments, the carrot should be updated fairly frequently to effectively keep it out of reach of the robot. The control signals can include commands to motors, gears, and actuators of the robot to either steer the robot, stop the robot, or propel the robot forward or backwards. The characteristics of the control signals will depend upon the characteristics of the robot.

In specific embodiments of the invention disclosed herein, the navigation path could provide a set point for the navigation system. For example, the generation of the control signal can include a feedback system that assures that a lowest pixel or set of pixels that are associated with the navigation path remain in the center of the bottom row of the image as the navigation path is continuously derived for additional images captured as the robot moves along with path. The navigation path could provide a set point for a proportional-integral-derivative (PID) controller. Flow chart 100 includes step 104 of generating a control signal for the autonomous navigation system to follow and a step 105 of navigating the robot to follow the navigation path. The control signal can be a signal to move various actuators such as motors, gears, and other actuators of the robot to steer or otherwise navigate the robot. The generating of the control signal can be conducted using a PID controller where the navigation path provides a set point for the PID controller.

In specific embodiments of the invention, the navigation path can be used to determine if there is an obstruction in the path of the robot. As described above, if the labels include a label for obstructions generally, or for particular obstructions such as humans, other farm equipment, etc., and conditions for a collision can be detected directly from an analysis of the image itself, then the navigation system can cause the robot to stop and wait for the obstruction to be removed or for human input to restart the robot. Alternatively, the navigation path could be used to determine if a label associated with an obstruction is in the path that the robot is intending to travel. In these embodiments, the step of navigating the robot using a control signal can include at least temporarily stopping the robot to avoid the collision. Temporarily stopping the robot can include ceasing movement until the obstruction has been detected to be removed or until a human operator restarts the navigation system.

In specific embodiments of the invention, the navigation path can be utilized in the frame of reference of the image, in alternative embodiments, the navigation path is converted to a different frame of reference for the robot to navigate along the path. For example, the navigation path could be converted to an Earth based coordinate system centered on the robot, or an Earth based coordinate system aligned with the crop row, a field in which the crop row is located, or the farm in which the crop row is located. The conversion of the navigation path to a different frame of reference can be achieved by registering the one or more imagers used to generate the image with that frame of reference ex ante. For example, the position of the robot in the frame of reference can be monitored and the position of the imager with respect to the robot can likewise be monitored or fixed. The conversion can in combination or in the alternative utilize sensors such as gravimetric sensors, magnetometers, gyroscopes, inertial movement units, odometry sensors, etc. to track the position and pose of the robot and or imager with respect to the frame of reference.

Figure 4:
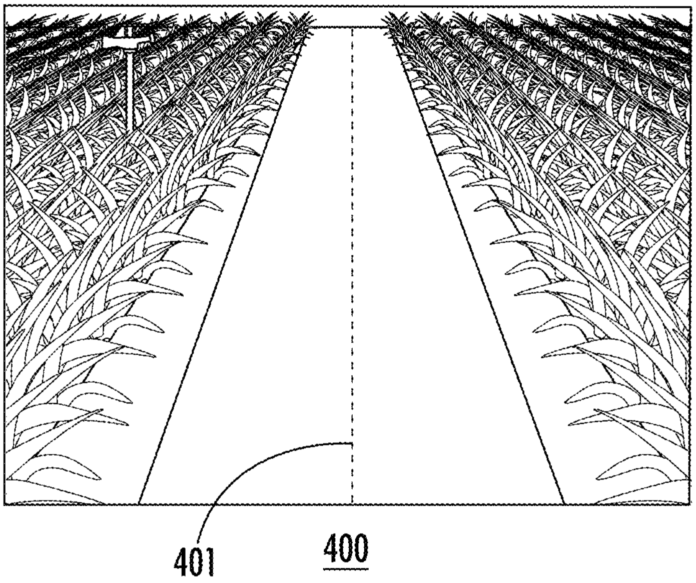
FIG. 4 illustrates two images which are taken by the same imager on a robot at two different times with one being used as the input to a segmentation network to ultimately derive a navigation path which is then projected onto the other image in accordance with specific embodiments of the invention disclosed herein.
Figure 4:
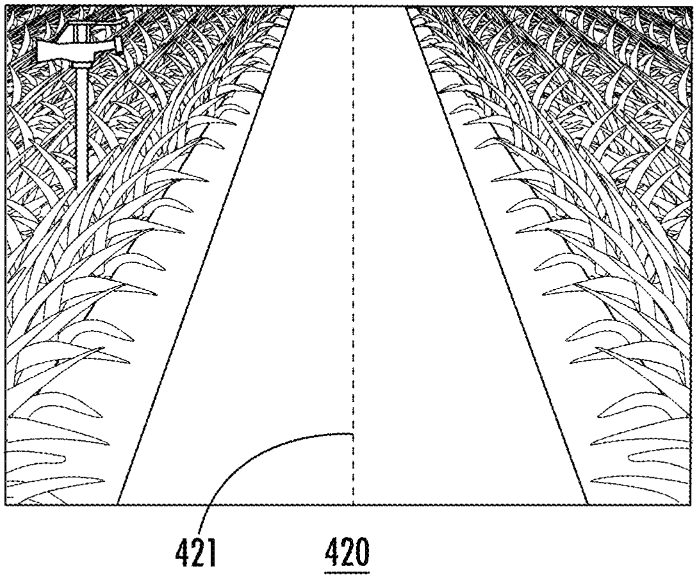
Figure 4:
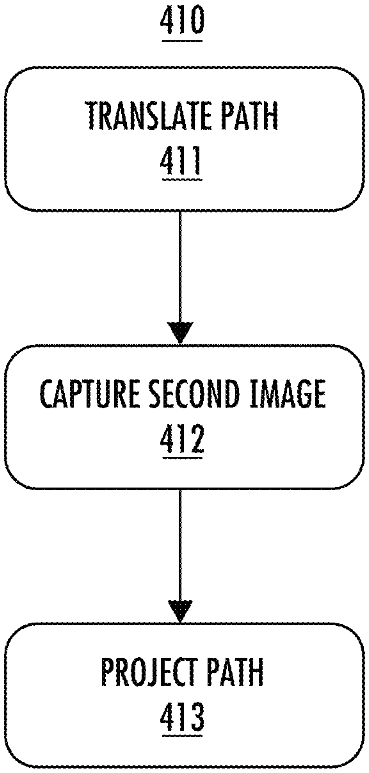

FIG. 4 includes images 400 and image 420 which are taken by the same imager on a robot at two different times with image 400 being used as the input to a segmentation network to ultimately derive a navigation path 401. For example, image 400 could be the image captured in step 101 and the navigation path 401 can be a navigation path as derived in step 103. Flow chart 410 includes a set of methods that begin with step 411 of translating a navigation path into a frame of reference. The navigation path can be navigation path 401 and the frame of reference can be an Earth based frame of reference. The flow chart continues with step 412 of capturing a second image of the crop row, where the second image is registered in the frame of reference. The second image can be image 420 and it can be registered with respect to the Earth based frame of reference using the same methods and/or systems associated with translating navigation path 401 into the frame of reference. Flow chart 410 continues with step 413 of projecting the navigation path onto the second image. The projected navigation path 421, as shown projected onto image 420, is no longer aligned with a center of the image. As such, a controller using the projected navigation path 421 as a part of a feedback control signal would guide the robot back in a countervailing direction to counter the misalignment.

As mentioned above, in specific embodiments of the invention disclosed herein, the segmenting of the image by the segmentation network can be augmented using geometric reasoning and/or additional sensor data to confirm the performance of the segmentation network. If a divergence is detected between the geometric reasoning or additional sensor data and the output of the segmentation network, various steps can be taken in response.

In the application of navigating a crop row, numerous geometric factors are available regardless of the type of crop and other factors a specific robot is faced with. As stated previously, with additional labels available, numerous geometric reasoning cross checks can be applied based on the expected geometric principles of the various segments. However, even if the segmentation network only outputs a binary label for an inter-crop row path, geometric cross checks can still be applied to check the status of the segmentation. For example, a geometric reasoning cross check could regard a pair of edges of the inter-crop row segment. In this example, the geometric reasoning cross check could be that a segmented inter-crop row path should include two approximately parallel lines in "birds' eye" view, while the edges of a segmented inter-crop row path should converge to a point when the imager is facing in the direction of travel and aligned with the crop row. If these principles were violated, the navigation system could determine that the segmentation was defective. As an example of additional geometric reasoning cross check that is available with more labels, the horizon line edge of a sky label should generally be flat and perpendicular to the frame of reference of a forward facing imager, the segmented inter-crop row path should converge to a point at the horizon line if the sky label is available, and the left and right crop row segments should be on their respective sides of the image and be separated by the inter-crop row path label. The robot can be augmented with additional sensors that can be used to derive the geometry of the environment. For example, the robot can generate odometry data, gravimetric data, inertial motion unit data, depth data derived from active depth sensors or stereo image capture sensors, and various other information sources. All these sources of information can be considered as a double check on the segmentation network. Furthermore, the additional information can be combined with the geometric reasoning to serve as a cross check on the segmentation. For example, depth information can be used to check a label using a geometric reasoning cross check such as by comparing a width of the segmentation of the inter-crop row path with a distance to the center point at which the width is measured.

In specific embodiments of the invention, the navigation system can take various actions in response to detecting a divergence or defective segmentation. For instance, in response to detecting a divergence, the navigation system can override a label and not generate a control signal based on the label. In embodiments in which the control loop is fast enough, multiple images in a row can have their labels discarded in this manner without impacting the performance of the navigation system. However, in alternative approaches, a divergence can be treated in the same manner as the detection of an obstruction as explained above. In these embodiments, detecting a divergence can lead to the robot stopping and waiting for manual input to proceed, or stopping until the robot captures an image with labels that do not violate a cross check. Alternatively, or in combination, detecting a divergence can prompt the system to request additional training data such as by notifying a human operator and presenting a user interface which is used to receive label inputs from the operator. In specific embodiments, the image that is presented to the operator for annotation will be the image for which the divergence was detected. The divergent segmentation can be overlaid on the image and presented to the user to allow them to modify it by providing corrections or by providing brand new segmentation label inputs. Similar responses can be taken in response to detecting potential obstructions.

Figure 5:
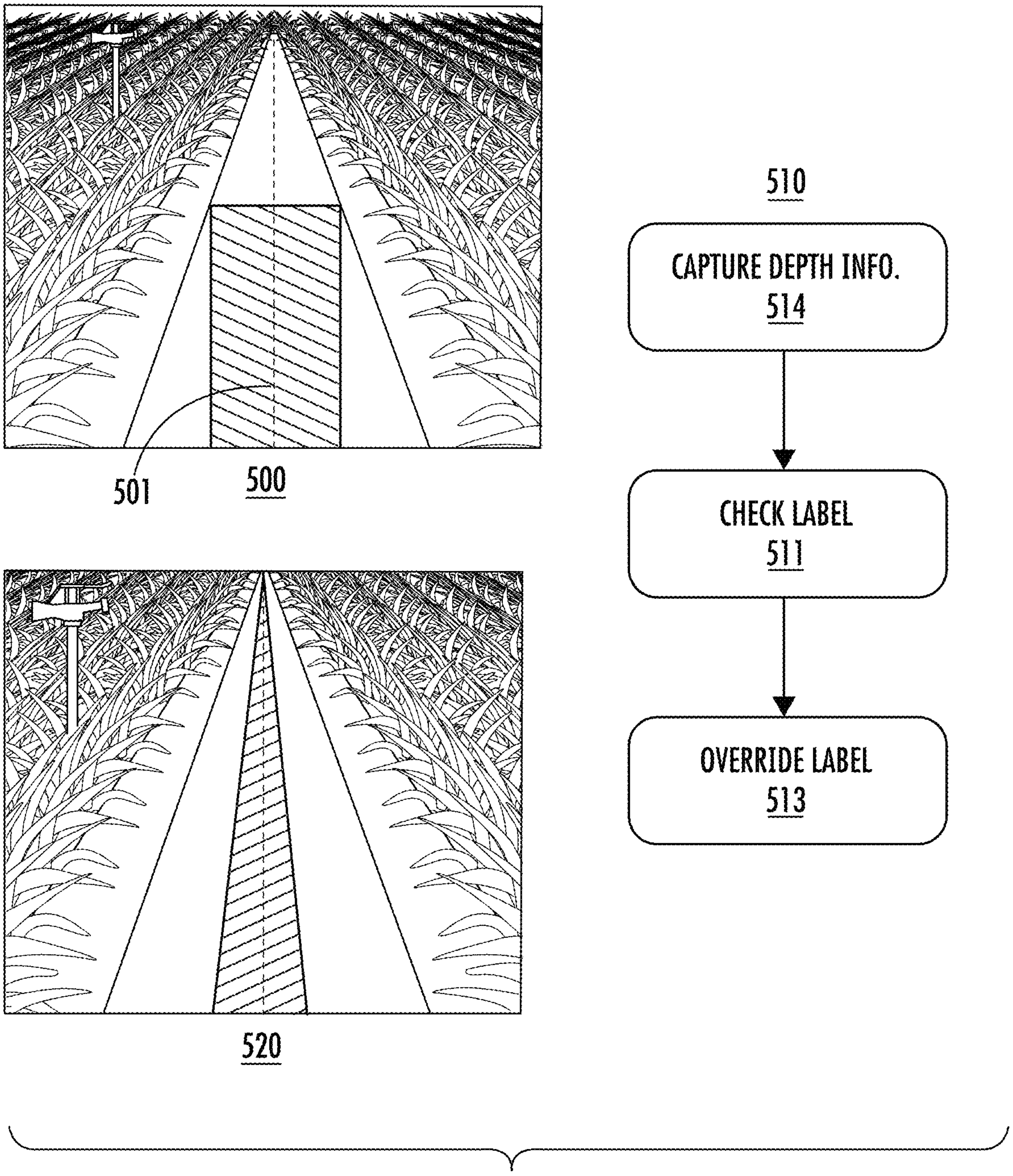
FIG. 5 illustrates two images with labeled portions which are used to check the label for the portion of the image using an expected geometric principle in accordance with specific embodiments of the invention disclosed herein.

FIG. 5 illustrates an image 500 with a labeled portion 501 of the image. Flow chart 510 includes step 511 of checking the label for the portion of the image using an expected geometric principle associated with navigating sets of crop rows. In this case, the principle is that the two edges of labeled portion 501 should converge. As seen in the image, the principle is violated and as such the check would fail. As such, flow chart 510 continues with step 513 of overriding the label. Accordingly, the robot would skip generating a control signal based on image 500 and would only again begin generating control signals when image 520 was used to generate a segment that did not violate a geometric check. The robot could also be designed to pause and wait for manual input at this point before continuing when a discrepancy was detected. Flow chart 510 could alternatively or in combination include step 514 of capturing depth information to be used in an iteration of step 511.

In specific embodiments of the invention, the segmentation network will be a trained machine intelligence system trained using a supervised training routine. In specific embodiments of the invention, training can be conducted in various ways and will depend on the characteristics of the trained machine intelligence system. For the avoidance of doubt, as used herein, the term trained machine intelligence system includes the system after it has been configured but is still resting in its default state (i.e., before training data has been applied). The training process generally involves collecting training data, inputting the training data to the trained machine intelligence system, and adjusting the characteristics of the trained machine intelligence system based on the output produced in response to the training data input. The adjustment step can include the use of matched output training data, which is associated with the input training data, to see if the output produced by the trained machine intelligence system matches the expected output. Training input data for which such output training data is available can be referred to as labeled training data.

In general, the training data will match the format of the data that the trained machine intelligence system will receive as inputs when it is deployed. For example, if the deployed system includes other data besides image data (e.g., the odometry data mentioned above) then the training data can include that data also. As another example, if the deployed system includes a visible light camera that will capture RGB images of the object, the training data can be RGB images of the object.

The training data can either be collected (e.g., using a camera capturing images of a portion of a crop row) or it can be synthesized (e.g., by augmenting the capturing images or using a three-dimensional model of the crop row as described below). Synthesized training data can be referred to as synthetic data. If the training data is collected, the ground truth training output data can be captured by presenting the images to a human operator and receiving labeling inputs from them on a user interface. Regardless of how the data is captured, the input training data can be modified with variances to improve the performance of the trained machine intelligence system. Additionally, the original capture and synthesis of the device can be conducted in a way that intentionally introduces variances. The variances can include variations in lighting, colors, adding atmosphere or weather effects, altering the surface materials of the object, dust effects, slight perturbations in the pose of the sensors, noise, and other distortions to assure that the trained machine intelligence system will operate regardless of errors in the sensors or changes in the conditions during operation of the system. The training data can also be generated using variances produced by a model of the variances of the sensors that will be obtaining the input data when the trained machine intelligence system is deployed. In these embodiments, the trained machine intelligence system will incorporate through its training a set of images of the known object where the known object is presented with a sampling of the variances mentioned above (e.g., where the known object is off center in the image).

In specific embodiments of the invention, in contrast to traditional training approaches, the segmentation network can be specifically trained or tuned for a specific set of crop rows in a single field or on a single farm. In these embodiments, the navigation system can include a segmentation network in an initial state which is then tuned or trained on images from a specific set of crop rows in which the navigation system will be deployed. This is somewhat counterintuitive in the field of machine intelligence as typically the goal is systems that generalize across a wide set of operating environments, for example, a system that can recognize all types of rows even without additional training. The problem with such general systems is that for complex environments, they can require an immense amount of labeled images, perhaps many billions of images before a general robots row detector is learned. In contrast, a given farmer only cares about their particular crop rows. In this case, it is possible to over train on just a few examples of a specific set of labeled images. For example, using the approaches disclosed herein, the labeled training data set required to provide adequate row following navigation performance, including avoiding collisions with obstacles such as humans or irrigation equipment in the field, can be as small as 10 to 15 frames of labeled data. The system will then perform very well on data or scenes that closely match the small set of labeled images but at the cost of being even less general on imagery that it may encounter in a different environment. This tradeoff between generality and focus can be expanded such that the segmentation network is trained on a set of crop rows where the set of crop rows share a single crop type. However, while such a network is more generalizable it is likely to require much more training data before reaching a point where it can perform reliability.

A training procedure for a segmentation network in accordance with specific embodiments of the invention can involve a robot being manually navigated down a crop row (e.g., using a joystick and a human driver) while capturing a set of images. In specific embodiments, a human driver can guide the robot down a crop row to obtain these initial images. Generally, the same sensors that will guide the navigation system when the robot is being used autonomously is used to capture the training images. Using these approaches, as an added benefit of training on a specific set of crop rows in which the robot will be operating, the navigation system will also train for any of the distortions of errors of the specific sensor that will be used to guide the robot.

Figure 7:
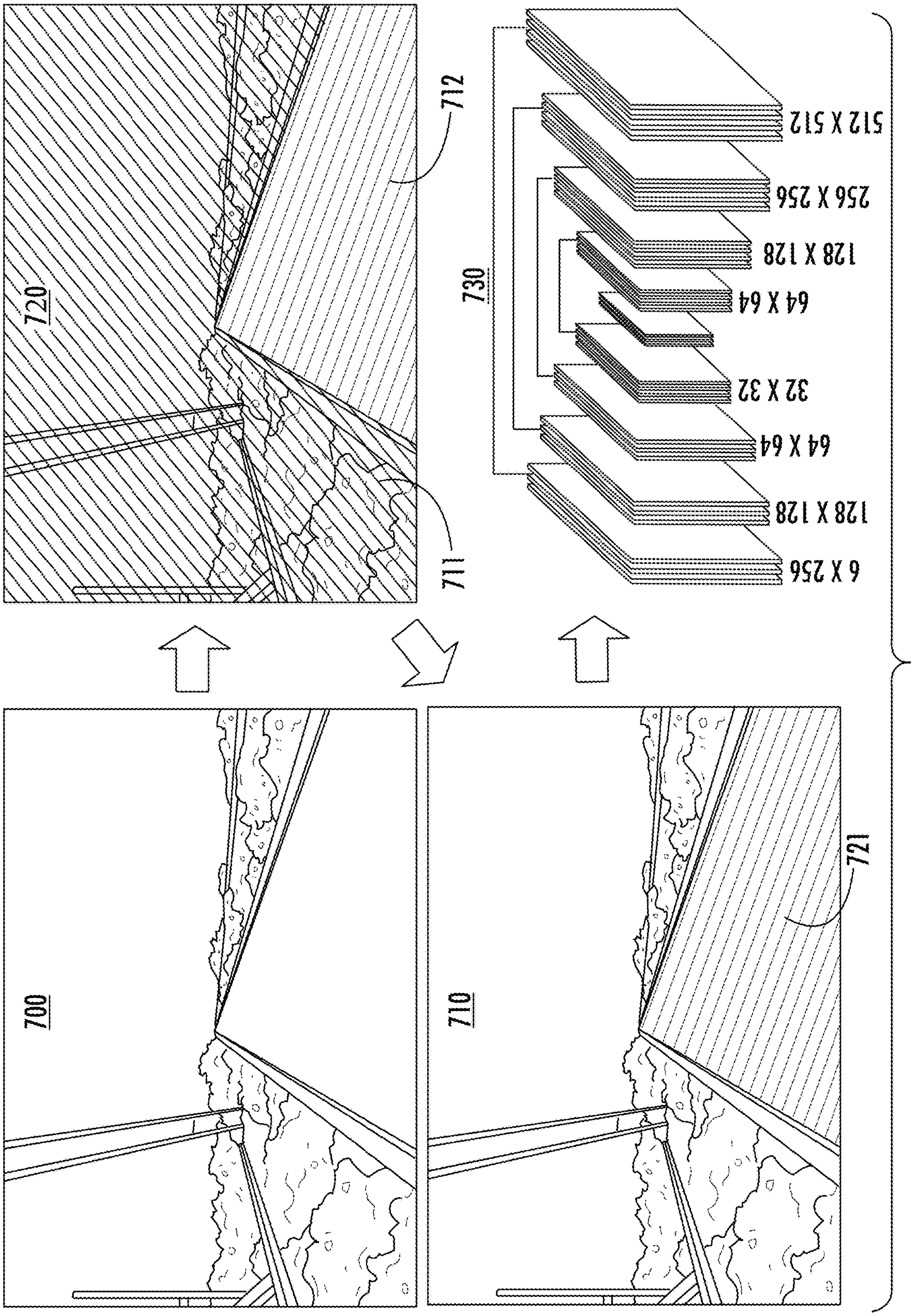
FIG. 7 illustrates a user interface on which an image has been displayed to receive multiple label inputs from a user to train a segmentation network in accordance with specific embodiments of the invention disclosed herein.

Flow chart 600 illustrates a set of methods for training a segmentation network that are in accordance with specific embodiments of the invention disclosed herein. Flow chart 600 begins with step 601 of capturing an image of at least a portion of a set of crop rows. As illustrated, the flow chart includes a loopback because a set of images can be captured by multiple iterations of step 601. The set of images captured through these iterations can all be images of at least a portion of a set of crop rows. They can be from the same row or from different rows. The process can also include instructing a human operator to capture images from an adjacent row. The image can be captured by the same sensors used to capture image 200 and the other sensors mentioned above. FIG. 7 provides an image 700 that can be the image obtained in this step. The flow chart 600 also includes training the segmentation network using the image or set of images. In specific embodiments, before the set of images can be used to train the segmentation network, they must be labeled using human inputs or alternative approaches as described below.

In specific embodiments of the invention, a human operator is provided with an intuitive interface for easily and efficiently generating the labels for a set of images that will be used as training data for the segmentation network. The interface can display the image to the user, such as on a touch screen, and accept inputs from the user to label one or more portions of the image. For example, the images could be displayed on a tablet computer to a user in the field with the robot. Alternatively, the images could be displayed on an integrated display present on the robot. Flow chart 600 includes step 602 of displaying an image on a user interface. Step 602 can be repeated through the process loop such that it involves displaying a set of images on the user interface. In specific embodiments, multiple images can be captured in step 601, and the set of images can be provided in bulk to the user in a single iteration of step 602. For example, the captured images can be from a sequence of video obtained while the robot is being manually navigated down the crop row, and an automated system can select still images from the video feed to display in step 602. The automated system can select still images based on a detected variance in the content of the images with a preference for selecting images for labeling with a larger degree of variance. Alternatively, the automated system can select still images from the video feed at random times or spaced apart at fixed intervals.

In specific embodiments of the invention, a human operator could provide labeling inputs to the images in various ways. The labeling inputs can be provided directly on the displayed images or with reference to the displayed images. Accordingly, flow chart 600 includes step 603 of accepting a set of label inputs on the set of images on the user interface, where the set of images can be the set of images displayed in either one or multiple iterations of step 602. For example, the set of label inputs could be a set of swipe inputs provided on a touch screen user interface to label certain portions of the image as an inter-crop row path and certain portions of the images as not the path. The swipe inputs could be directed to regions of the image and used directly as the label inputs for the training data. Alternatively, the swipe inputs could be utilized by a standard computer vision processing system to dilate and/or contract the swiped input to fit a region of the image that the processing system identifies as contiguous (e.g., an approximate swipe on a left crop row is expanded using an edge analysis to select all pixels that are contiguous with the swipe and have a pixel value within a range of values to the median of the pixel values selected by the swipe). As another example, the set of label inputs could be a set of polygon inputs provided on a touch screen user interface. The polygon inputs could be provided in a sequence of taps with the user interface automatically connecting consecutively taped points on the image until a close loop path was formed. Alternatively, or in combination, a template of polygons could be provided for the user to drag onto the display and size appropriately. The template of polygons could be selected from a group that fit the general shape of the labeled portions (e.g., the inter-crop row path label for a forward-looking sensor could be a generally triangular shape). Standard computer vision processing systems could also be applied to estimate the location of specific regions in the image and provide a best guess set of labels to the image along with user interface options to allow the user to adjust the polygons provided by the user.

In specific embodiments of the invention, a human operator could provide labeling inputs to an image with respect to more than one label. For example, the set of label inputs could be directed to a set of at least three different labels. The different labels could be individually selectable from a menu such that the user could select the label and then provide the associated label inputs on or in relation to the image with the associated label selected. Alternatively, the different labels could be represented to the user in sequence and the user could provide the associated label inputs for those labels when prompted. In specific embodiments of the invention, the labels can be applied to at least one user defined label. In these embodiments, the user could be provided with the option to specify a text string to represent the label using a keyboard or voice input, and then provide the associated label inputs in association with their own specified label. For example, a user could identify different kinds of crops, or recurring features that are unique to their field or farm that can help to guide the robot down a crop row, preventing the robot from colliding with an obstruction. In specific embodiments, a user could specify whether the label was associated with a landmark or obstruction for the segmentation to be utilized by the navigation system appropriately.

FIG. 7 illustrates a user interface on which image 700 has been displayed to receive multiple label inputs from a user. As illustrated, the label inputs are in the form of polygon inputs which the user has used to specify an inter-crop row path polygon 712 and a not inter-crop row path polygon 710. The polygon inputs in the illustrated case have been provided by the user tapping corners of the polygon in a pattern that returns to the original tap point. The two different polygons were specified by the user while the user interface was expecting two different labels. As illustrated, the polygons do not align with the identified regions perfectly. However, the inventors have found that even these rough inputs are enough to produce training data to have a robot perform adequately in a crop row following navigation routine. Again, in specific embodiments, the rough inputs are used directly as the training data while in other approaches the rough inputs are processed by standard computer vision routines to more specifically select the region of the image associated with a given label. In these embodiments, the user can be given the option to review the output of the standard computer vision routines and accept them or override them fully or partially. The approaches disclosed in this paragraph could generate labeled training image 720 with image 700 serving as the input and label 721 serving as the expected output of the segmentation network. The labeled training image could then be used to train segmentation network 730.

In specific embodiments of the invention, the set of images required to be annotated by a human user can be a small number, such as 15-30 frames, while still producing enough training data to sufficiently segment a path from a set of images of a crop row on the same farm. This is beneficial because it puts less of a tax on the time of the human operator in setting up the robot to work on the farm. Combined with the fact that in specific embodiments, the labeled regions do not need to perfectly correspond with the labeled regions this produces an extremely efficient method for generating the required training data. This low number of frames, and low degree of accuracy, can be sufficient owing to the minimal performance required to sufficiently segment a path for the purposes of guiding a robot to follow a row of crops. This low performance requirement is due to the often-clear visible distinction between a row of green plants and the brown soil between crow rows, and to the relatively low speed of agricultural robots when compared to other autonomous vehicles such as cars on a freeway. Furthermore, the low number of frames can still provide a large amount of training data as the labeled training data can be augmented using training data synthesis in which the original labeled images are modified as described below. Using these techniques, thousands of labeled training inputs can be generated from 15-30 frames of labeled training data, and this larger set of thousands of training inputs can be used to train the segmentation network.

Furthermore, in specific embodiments of the invention disclosed herein, the labeled training data can be obtained entirely without labeling inputs from a human operator. For example, a method could comprise capturing a set of images of at least a portion of the set of crop rows while navigating a robot down the crop row and conducting a photogrammetric analysis or optical flow analysis on the set of images to generate a set of label inputs on the set of images. The photogrammetric analysis includes solving for a path location in a first image based on an analysis of a second subsequently captured image. The analysis of the second subsequently captured image would involve analyzing the two images for a common set of one or more features and determining how the robot moved between the two images. The movement could then be projected onto the first image with the projection thereby serving as an identification of at least a portion of the inter-crop row path. In these embodiments, a user could solely be required to navigate the robot manually down a crop row, and the system would capture the series of two or more images required for such photogrammetric analysis. The photogrammetric analysis or optical flow could include a large set of images and the derivation of a path across the images to generate the labeled training data images required to train the segmentation network. For example, such a process could automatically generate labeled training image 720 with image 700 serving as the input and label 721 serving as the expected output of the segmentation network. The labeled training image could then be used to train segmentation network 730.

Figure 6:
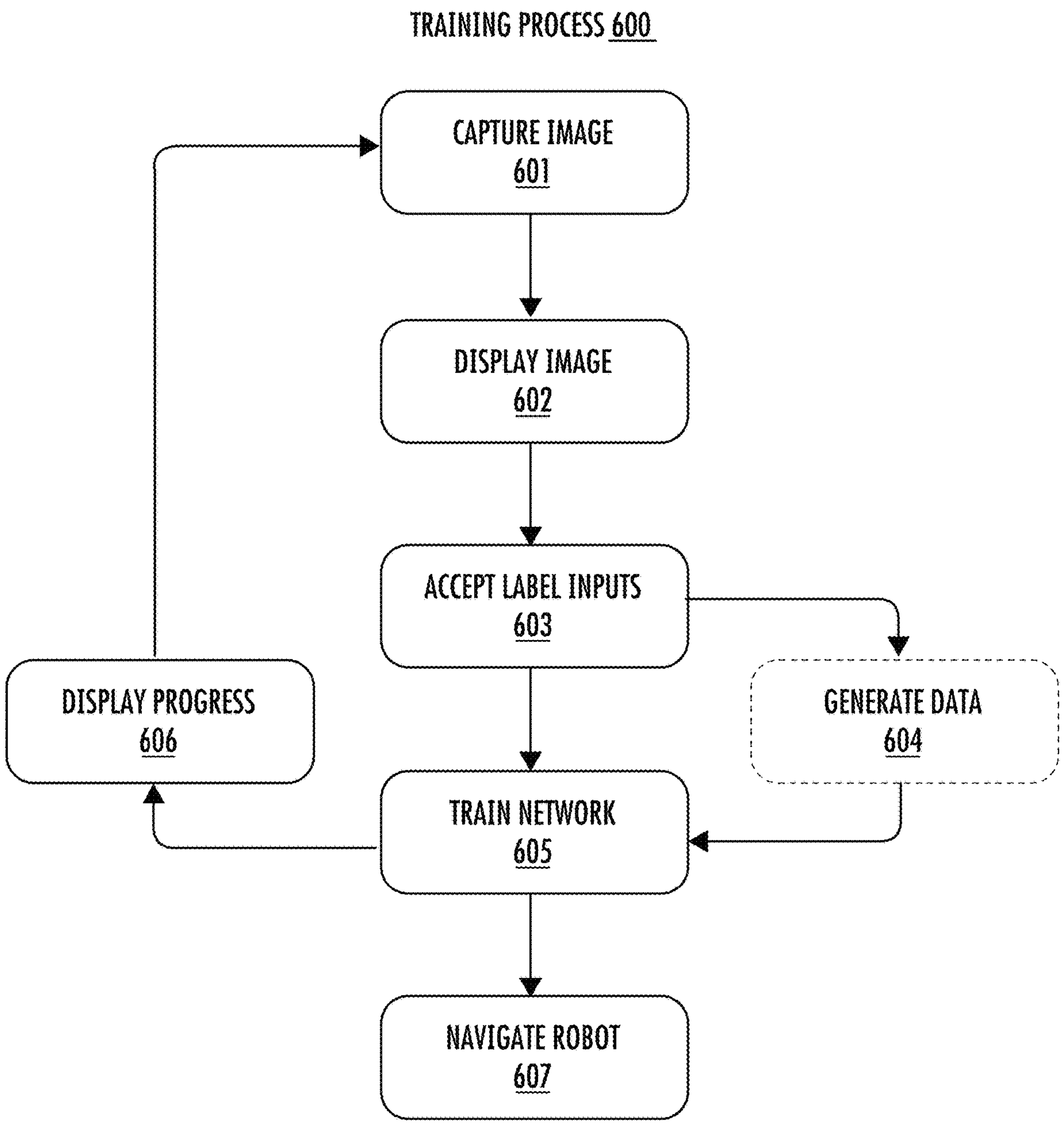
FIG. 6 illustrates a flow chart for a set of methods for training a network and navigating a robot using the trained network in accordance with specific embodiments of the invention disclosed herein.

In specific embodiments of the invention, the labeled training data can be used to train the segmentation network. In these embodiments, a labeled image can be provided to the segmentation network as an input, and the labels generated by the segmentation network in response thereto can be compared to the labels collected using any of the processes described above. A difference between the two can then be used to update the weights, filters, or other values of the segmentation network as based on the characteristics of the segmentation network. The step can be iterative in that the accuracy of the segmentation network can be monitored by an automated system or a human operator and additional training data can be synthesized or obtained to bring the performance of the segmentation network to a desired level. Once trained, the segmentation network can then be used by a navigation system to navigate the robot in any manner. For example, the segmentation network can be used to navigate a robot in the manner described above with reference to FIG. 1. An example of these steps is provided in FIG. 6 in steps 605 and 607. Step 605 comprises training the segmentation network using a set of label inputs, such as those obtained in step 605, and a set of images, such as those obtained in step 601. Step 607 comprises navigating, after training the segmentation network, such as in step 605, the robot along the crop row using the segmentation network.

In specific embodiments of the invention, the training progress can be displayed to a human operator. For example, a user can be presented with a simple progress bar to indicate how many more images need to be collected or for how much longer they need to manually navigate the robot. The progress indicator can also include prompts to instruct the user to capture images of a different portion of the crop row or a different crop row. The training progress indicator can also include displaying the performance of the segmentation network in labeling images captured by the sensors of the robot. For example, the user can review additional images collected by the sensors of the robot while the navigation system labels the images in real time as it is being trained. Alternatively, the system can play back video captured by the robot with the labels overlain on the images. In either case, the user can review the segmentation performance and determine if it is acceptable. The user can provide an input to indicate that training is complete to the system upon making this determination. Alternatively, the system can determine that training is complete by evaluating the performance of the segmentation network against additional training data that was not used to train the segmentation network.

Flow chart 600 includes step 606 of displaying a segmentation network training progress indicator on the user interface. The segmentation network training progress indicator can include a visual depiction of a labeling of the segmentation network on a test image. For example, image 700 can be presented to the user with label 721 overlain on the image as shown in labeled training image 720. In this example, the training image is a test image in that it was not used to train the image and is instead being used to test and present the performance of the segmentation network to a user. The training progress indicator in this embodiment is provided by a user conducting a manual evaluation of how well the segmentation network has performed on the image (e.g., if the performance is low, not much progress has been made). In specific embodiments, the segmentation network training progress indicator can include displaying an indication that more images are required. This indication can be an overt indication in the form of a text output with this message or a progress bar indicating the number of images the system expects will be needed to complete the training of the segmentation network.

In specific embodiments of the invention, a training procedure for a segmentation network is augmented with a step of generating synthesized data to train the segmentation network. This step is represented in flow chart 600 as step 604 of generating, using the set of images captured in a single or multiple iterations of step 601, a larger set of synthesized training images. The step can involve taking the images and warping the images, modifying their geometry, adding noise, changing the lighting via relighting, blurring the images, recoloring the images, and various other techniques to generate a larger set of images. In specific embodiments of the invention, the set of images can be smaller than 100 or smaller than 20 images and the larger set of synthesized training images can be larger than 500 images. In specific embodiments of the invention, this step can involve using photogrammetry to create a 3D model of the crop row so that the images can be augmented realistically via actual lighting conditions detected and realistic surface reflectance models of elements in the crop row such as the plants or soils. The larger set of images generated according to any of the approaches disclosed above can then be used in step 605 to train the segmentation network to produce a segmentation network with a higher degree of generalizability and performance than a network that is trained only on the original images captured via one or more iterations of step 601.

In specific embodiments of the invention, a navigation system for navigating a robot along a crop row comprises a sensor and an actuator on the robot. The system can also include a means for capturing an image of at least a portion of the crop row using the sensor. The means for capturing an image can be any of the sensors mentioned in the disclosure above that can capture an image. The means for capturing an image can also include instructions stored in a non-transitory computer readable medium to control those sensors to cause the sensors to capture sensor data and store the data generated by the sensors. The system can also include a segmentation network such as the ones described herein to label a portion of the image captured by the means for capturing an image. The system can also include a means for deriving a navigation path from the portion of the image with the label as generated by the segmentation network. The means for deriving a navigation path can include instructions stored in a non-transitory computer readable medium to execute step 103 as described herein. The system can also include a means for generating a control signal, for the actuator, to cause the robot to follow the navigation path. The means for generating the control signal can include instructions stored in a non-transitory computer readable medium to execute step 104 as described herein.

The system can also include a means for checking the label for the portion of the image using an expected geometric principle associated with navigating sets of crop rows. The means checking the label for the portion of the image using an expected geometric principle associated with navigating sets of crop rows can include instructions stored in a non-transitory computer readable medium to execute the comparisons of the relative portions of the labeled image as described above such as storing a geometric principle and evaluating a geometric principle of the edges of a segment, evaluating a relative position of one or more of the segments, evaluating an overlap of one or more of the segments, or evaluating a relative location in the image of one or more of the segments to detect a discrepancy from the geometric principle. The system can also include a means for overriding the label if the expected geometric principle is violated. The means for overriding the label if the expected geometric principle is violated can include instructions stored in a non-transitory computer readable medium to cause the system to interrupt a control flow of the navigation control loop described with reference to FIG. 1 and discard a segmentation. As such, overriding the label does not need to include presenting an alternative label in place of the labeled which caused the system to detect a discrepancy.

The system can also include a means for capturing depth information from a crop row. The means for capturing depth information from a crop row can a dedicated depth sensor such as an active or passive depth sensor (e.g., an ultraviolet projection depth sensor), a LIDAR system, a radar, or any other form of depth sensor including one or more visible light sensors that derive depth information using stereo vision processing techniques.

The system can also include a means translating the navigation path into a frame of reference. The means for translating the navigation path into a frame of reference can include instructions stored in a non-transitory computer readable medium to evaluate the image in which the navigation path has been defined, access a registration of the sensor that captured the image with the frame of reference, and apply the registration to alter the coordinates of the navigation path into the frame of reference.

The system can also include a means for capturing a second image of the crop row. The means for generating the second image can include any of the sensors and other means described with reference to the means for capturing an image as described herein above.

The system can also include a means for projecting the navigation path onto the second image. The means for projecting the navigation path onto the second image can include instructions stored in a non-transitory computer readable medium to evaluate the second image, access a registration of the sensor that captured the second image with the frame of reference, and apply the registration in reverse to alter the coordinates of the navigation path in the frame of reference onto elements of the second image.

The system can also include a means for capturing a set of images of at least a portion of a set of crop rows. The means for capturing a set of images can include any of the sensors and other means described with reference to the means for capturing an image as described herein above.

The system can also include a means for generating, using the set of images, a larger set of synthesized training images. The means for generating, using the set of images, a larger set of synthesized training images can include instructions stored in a non-transitory computer readable medium to execute the approaches described with reference to step 604 above and can include random number generators, image filters, a model of the ambient lighting when the set of images where captured, and a three-dimensional model of a crop row or set of crop rows from which the image was taken.

The system can also include a means for training the segmentation network using the set of images. The means for training the segmentation network using the set of images can include instructions stored in a non-transitory computer readable medium to execute step 605 mentioned above including a system for applying an training input to the segmentation network, a system for evaluating a resulting output of the segmentation network as compared to a matched expected training output associated with that training input, and a system for adjusting the values that define the segmentation network based on that evaluation.

A segmentation network that has been trained using specific embodiments of the invention disclosed herein, and the training data that is obtained using specific embodiments of the invention disclosed herein can, over time, be used to produce a generalized network that can operate in any farm with any style of crop row without the need for the preliminary capture of images at that farm. However, even in that situation certain benefits may still accrue from allowing the network to be overtrained on the specific crop rows or on farm specific structures such as hydroponic support poles or irrigation pipes in which or around which the network will operate. Given the minimal amount of effort required to train the navigation system, it is even more likely that such a procedure would be conducted regardless of how general or accurate the network became.

There are numerous applications for various embodiments of the invention disclosed herein. For example, once a path has been segmented from a portion of an image, the path can be passed to, a robotic system, a navigation system for carts or drones, a person or vehicle tracker, a landing or docking system for a spacecraft, or a system for "assisted teleoperation." In the example of assisted teleoperation, a vehicle or robot can mostly travel or move (respectively) by itself thereby taking the burden off a human operator who is in command of the vehicle or robot but doesn't need to be much of the time. This allows one operator to potentially direct many vehicles or robots. For example, in assisted teleoperation, a farmer may direct several robots to the general start of rows in several fields. Once the robot gets there, it can notify the operator. The operator may then release the robot to start weeding a row of crops and the robot knows how to go down rows of plants without driving over them. It may then allow the operator to teleoperate, turning the robot around, or the robot may know how to turn around and do another row all by itself. This leaves an operator mostly free to conduct operations at a high level rather than having to drive every vehicle or robot in detail.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, while the example of agricultural applications with field robots was used throughout the specification, specific embodiments of the invention disclosed herein are more broadly applicable to any robotic navigation or robotic manipulation application. Furthermore, while the example of a field robot following a crop row was used throughout the specification, specific embodiments of the invention disclosed herein are more broadly applicable to various other autonomous navigation applications in which a robot is designed to follow a path. These modifications and variations to the present invention may be practiced by those skilled in the art, without departing from the scope of the present invention, which is more particularly set forth in the appended claims.

What is claimed is:

1. A method for navigating a robot along a crop row, in which each step is computer-implemented by a navigation system for the robot, the method comprising:

training a segmentation network using a set of images of a set of crop rows and a set of synthesized training images generated using the set of images, wherein the set of images comprises 100 or fewer images and wherein the set of synthesized training images comprises 500 or more images;

capturing an image of at least a portion of a crop row of the set of crop rows;

labeling, using the segmentation network, a portion of the image with a label;

deriving a navigation path from the portion of the image and the label;

generating a control signal for the navigation system to follow the navigation path; and navigating the robot along the crop row using the control signal.

2. The method of claim 1, further comprising:

checking the label for the portion of the image using an expected geometric principle associated with navigating sets of crop rows; and overriding the label if the expected geometric principle is violated.

3. The method of claim 2, further comprising:

capturing depth information from the crop row;

wherein the checking of the label using the expected geometric principle includes using the depth information.

4. The method of claim 2, wherein:

the label is for an inter-crop row path; and the expected geometric principle associated with navigating sets of crop rows regards a pair of edges of the portion of the image.

5. The method of claim 1, wherein:
the generating of the control signal is conducted using a proportional-integral-derivative controller; and
the navigation path provides a set point for the proportional-integral-derivative controller.

6. The method of claim 1, wherein generating the control signal includes:
translating the navigation path into a frame of reference;
capturing a second image of the crop row, wherein the second image is registered in the frame of reference; and
projecting the navigation path onto the second image.

7. The method of claim 1, further comprising, prior to capturing the image:
displaying the set of images on a user interface;
accepting a set of label inputs on the set of images on the user interface; and
training the segmentation network using the set of label inputs and the set of images.

8. The method of claim 1,
wherein the set of crop rows are one of: (i) on a single farm; or (ii) share a single crop type.

9. The method of claim 1, wherein
generating the set of synthesized training images includes conducting at least one operation on the set of images selected from: warping, blurring, relighting, and recoloring.

10. The method of claim 1, further comprising:
labeling, using the segmentation network, a second portion of the image with a second label;
wherein: (i) the label is for an inter-crop row path; (ii) the second label is for a potential obstruction; and (iii) navigating the robot along the crop row using the control signal includes at least temporarily stopping the robot to avoid a collision.

11. The method of claim 1, wherein:
the image is captured by at least one imager on the robot; and
the segmentation network is computer-implemented on the robot.

12. The method of claim 1, wherein:
the robot includes at least two imagers;
the image is captured using the at least two imagers; and
the image includes depth information.

13. A navigation system for navigating a robot along a crop row comprising:
a sensor;
an actuator on the robot;
a means for capturing a set of images of a set of crop rows including an image of at least a portion of the crop row using the sensor;
a means for generating, using the set of images, a larger set of synthesized training images;
a means for training a segmentation network for labeling a portion of the image with a label using the set of images and the set of synthesized training images, wherein the set of images comprises 100 or fewer images and wherein the set of synthesized training images comprises 500 or more images;
a means for deriving a navigation path from the portion of the image with the label; and
a means for generating a control signal, for the actuator, to cause the robot to follow the navigation path.

14. The navigation system of claim 13, further comprising:
a means for checking the label for the portion of the image using an expected geometric principle associated with navigating sets of crop rows; and
a means for overriding the label if the expected geometric principle is violated.

15. The navigation system of claim 14, further comprising:
a means for capturing depth information from the crop row;
wherein the checking of the label using the expected geometric principle includes using the depth information.

16. The navigation system of claim 13, further comprising:
a means for translating the navigation path into a frame of reference;
a means for capturing a second image of the crop row, wherein the second image is registered in the frame of reference; and
a means for projecting the navigation path onto the second image.

17. The navigation system of claim 13,
wherein the set of crop rows are one of: (i) on a single farm; or (ii) share a single crop type.

* * * * *